US010674415B2

(12) United States Patent
Sharma

(10) Patent No.: US 10,674,415 B2
(45) Date of Patent: Jun. 2, 2020

(54) SPLIT OF CONTROL- AND USER-PLAN DURING LTE-WLAN AGGREGATION HANDOVERS

(71) Applicant: NEC Corporation, Tokyo (JP)

(72) Inventor: Vivek Sharma, Sutton (GB)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/748,432

(22) PCT Filed: Aug. 10, 2016

(86) PCT No.: PCT/JP2016/003708
§ 371 (c)(1),
(2) Date: Jan. 29, 2018

(87) PCT Pub. No.: WO2017/029796
PCT Pub. Date: Feb. 23, 2017

(65) Prior Publication Data
US 2018/0227815 A1 Aug. 9, 2018

(30) Foreign Application Priority Data

Aug. 14, 2015 (GB) .................................. 1514539.4

(51) Int. Cl.
H04W 36/08 (2009.01)
H04W 76/15 (2018.01)
(Continued)

(52) U.S. Cl.
CPC .......... H04W 36/08 (2013.01); H04W 28/08 (2013.01); H04W 36/0069 (2018.08);
(Continued)

(58) Field of Classification Search
None
See application file for complete search history.

(56) References Cited

U.S. PATENT DOCUMENTS

2013/0208661 A1* 8/2013 Nylander .............. H04W 48/17
370/328
2013/0229931 A1* 9/2013 Kim ...................... H04W 24/10
370/252
(Continued)

FOREIGN PATENT DOCUMENTS

CN 103703696 A 4/2014
JP 2014-096664 A 5/2014
(Continued)

OTHER PUBLICATIONS

3GPP TS 23.402, V.13.2.0 (Jun. 2015), Technical Specification, "3rd Generation Partnership Project; Technical Specification Group Services and System Aspects; Architecture enhancements for non-3GPP accesses (Release 13)", Jun. 2015, pp. 1-292.
(Continued)

Primary Examiner — Anh Vu H Ly
(74) Attorney, Agent, or Firm — Sughrue Mion, PLLC

(57) ABSTRACT

A communications system is described in which a base station controls interworking between a cell of the base station operating according to a first radio access technology and cells of access points operating according to a second radio access technology. The base station transmits control plane data to a mobile device in its cell, wherein the control plane data facilitates user plane communication by the mobile device, via a first access point. When the user plane communication has been handed over from the first access point to a second access point, the base station receives information identifying the second access point. Beneficially, the base station uses the received information for controlling the interworking and/or controlling a handover for the mobile device.

9 Claims, 9 Drawing Sheets

(51) Int. Cl.
*H04W 88/06* (2009.01)
*H04W 36/00* (2009.01)
*H04W 28/08* (2009.01)
*H04W 84/12* (2009.01)

(52) U.S. Cl.
CPC ........... *H04W 76/15* (2018.02); *H04W 88/06* (2013.01); *H04W 84/12* (2013.01)

(56) References Cited

U.S. PATENT DOCUMENTS

| | | | |
|---|---|---|---|
| 2014/0004863 A1 | 1/2014 | Zhang et al. | |
| 2014/0029570 A1* | 1/2014 | Lee .................. | H04W 36/0005 370/331 |
| 2014/0086211 A1* | 3/2014 | Liu .................. | H04L 45/38 370/331 |
| 2014/0329526 A1* | 11/2014 | Sundararajan ........ | H04W 36/24 455/436 |
| 2015/0148038 A1* | 5/2015 | Griot ...................... | H04W 8/18 455/435.3 |
| 2015/0304913 A1 | 10/2015 | Uusitalo et al. | |
| 2015/0312776 A1* | 10/2015 | Cui ....................... | H04W 24/02 370/235 |
| 2015/0312810 A1 | 10/2015 | Yasuda et al. | |
| 2016/0174285 A1 | 6/2016 | Ke et al. | |
| 2016/0219475 A1* | 7/2016 | Kim .......................... | H04L 5/00 370/328 |
| 2016/0373992 A1* | 12/2016 | Jung ................. | H04W 36/0022 370/328 |
| 2017/0013513 A1* | 1/2017 | Agarwal ............... | H04W 36/22 370/328 |
| 2017/0070923 A1* | 3/2017 | Li ..................... | H04W 36/0066 370/328 |
| 2017/0150411 A1* | 5/2017 | Zhong ..................... | H04L 29/06 370/328 |
| 2017/0215115 A1* | 7/2017 | Vesterinen ............ | H04W 36/18 370/328 |
| 2017/0318493 A1* | 11/2017 | Laselva ................. | H04W 28/08 370/328 |

FOREIGN PATENT DOCUMENTS

| | | |
|---|---|---|
| WO | 2013/120274 A1 | 8/2013 |
| WO | 2014/013291 A1 | 1/2014 |
| WO | 2014/073302 A1 | 5/2014 |
| WO | 2014112563 A1 | 7/2014 |
| WO | 2014182613 A1 | 11/2014 |
| WO | 2014182714 A1 | 11/2014 |
| WO | 2015/016654 A1 | 2/2015 |
| WO | 2015/057343 A1 | 4/2015 |

OTHER PUBLICATIONS

3GPP TR 36.875, V. 13.0.0 (Jun. 2015), Technical Report, "3rd Generation Partnership Project; Technical Specification Group Radio Access Network; Evolved Universal Terrestrial Radio Access Network (E-UTRAN); Extension of dual connectivity in E-UTRAN (Release 13)", Jun. 2015, pp. 1-38.

3GPP TR 37.870, V13.0.0 (Jun. 2015), Technical Report, "3rd Generation Partnership Project; Technical Specification Group Radio Access Network; Study on Multiple Radio Access Technology (Multi-RAT) joint coordination (Release 13)", Jun. 2015, pp. 1-24.

3GPP TS 36.413, V13.0.0 (Jun. 2015), Technical Specification, "3rd Generation Partnership Project; Technical Specification Group Radio Access Network, Evolved Universal Terrestrial Radio Access Network (E-UTRAN), S1 Application Protocol (S1AP) (Release 13)", Jun. 2015, pp. 1-302.

3GPP TSG RAN WG2 Meeting #90, R2-152531, "WLAN-LTE control plane framework," NEC, May 25-29, 2015, pp. 1-3.

3GPP TSG-RAN Working Group 2 meeting #91, R2-15xxxx, "Draft Report of 3GPP TSG RAN WG2 meeting #90," ETSI MCC, Aug. 24-28, 2015, pp. 1-139.

Written Opinion of the International Searching Authority of PCT/JP2016/003708 dated Nov. 15, 2016.

International Search Report of PCT/JP2016/003708 dated Nov. 15, 2016.

Communication dated Dec. 11, 2018 from the Japanese Patent Office in application No. 2018-507652.

3rd Generation Partner Project; Technical Specification Group Radio Access Network; Study on Multi-RAT joint coordination (Release 13), 3GPP TR 37.870 V1.0.0, 2015, pp. 1-22.

Nokia Networks, "Control plane protocol architecture for LTE-WLAN integration", 3GPP TSG-RAN WG2 Meeting #90, May 25-29, 2015, R2-152103, total 4 pages.

Communication dated Nov. 13, 2019 from European Patent Office in counterpart EP Application No. 16759884.6.

Communication dated Mar. 4, 2020 from the China National Intellectual Property Administration in CN Application No. 201680047854.2.

Decision to Grant a Patent dated Apr. 14, 2020, from the Japanese Patent Office in Application No. 2018-507652.

* cited by examiner

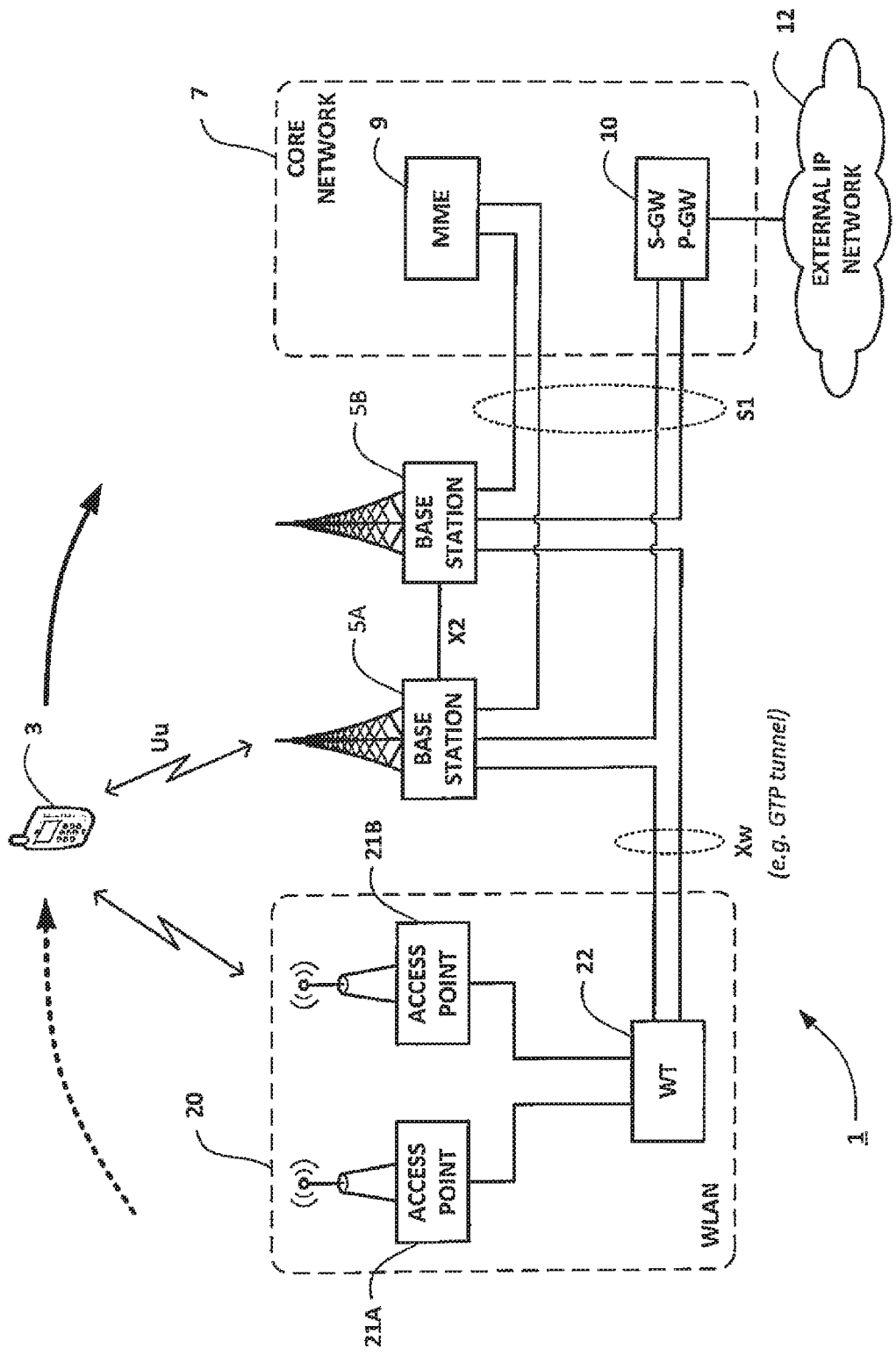
[Fig. 1]

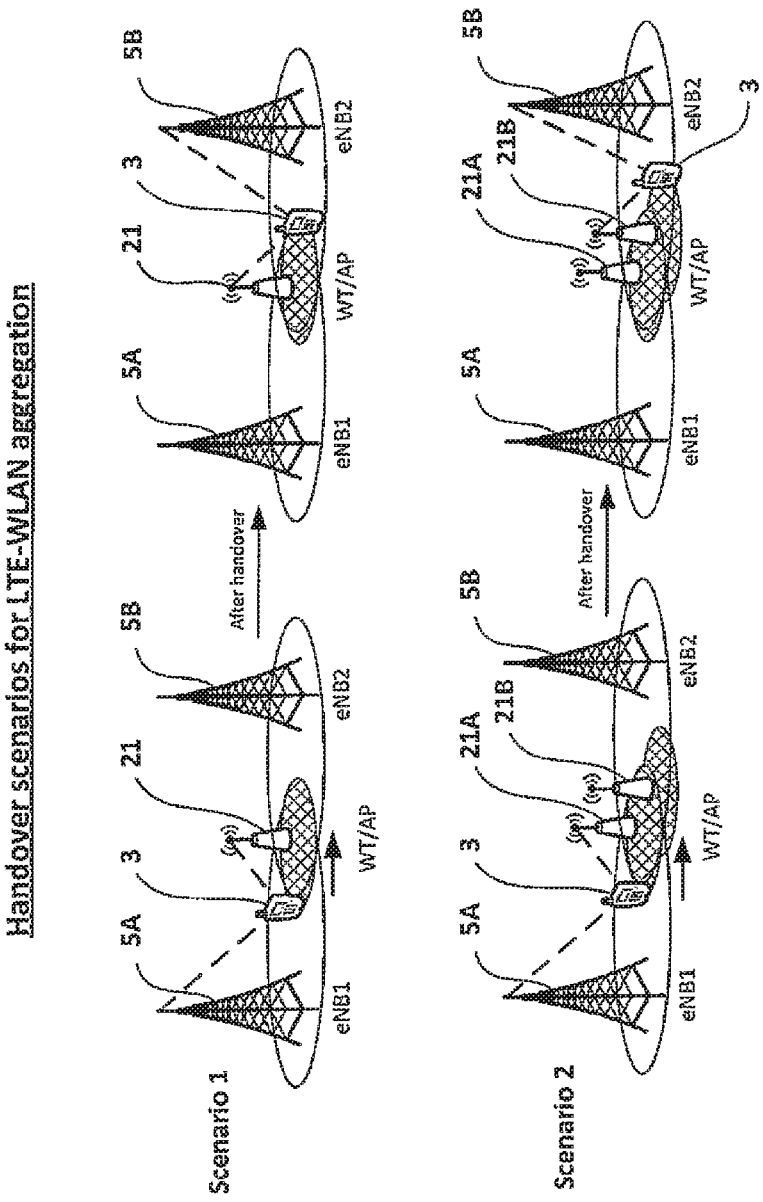

[Fig. 3]
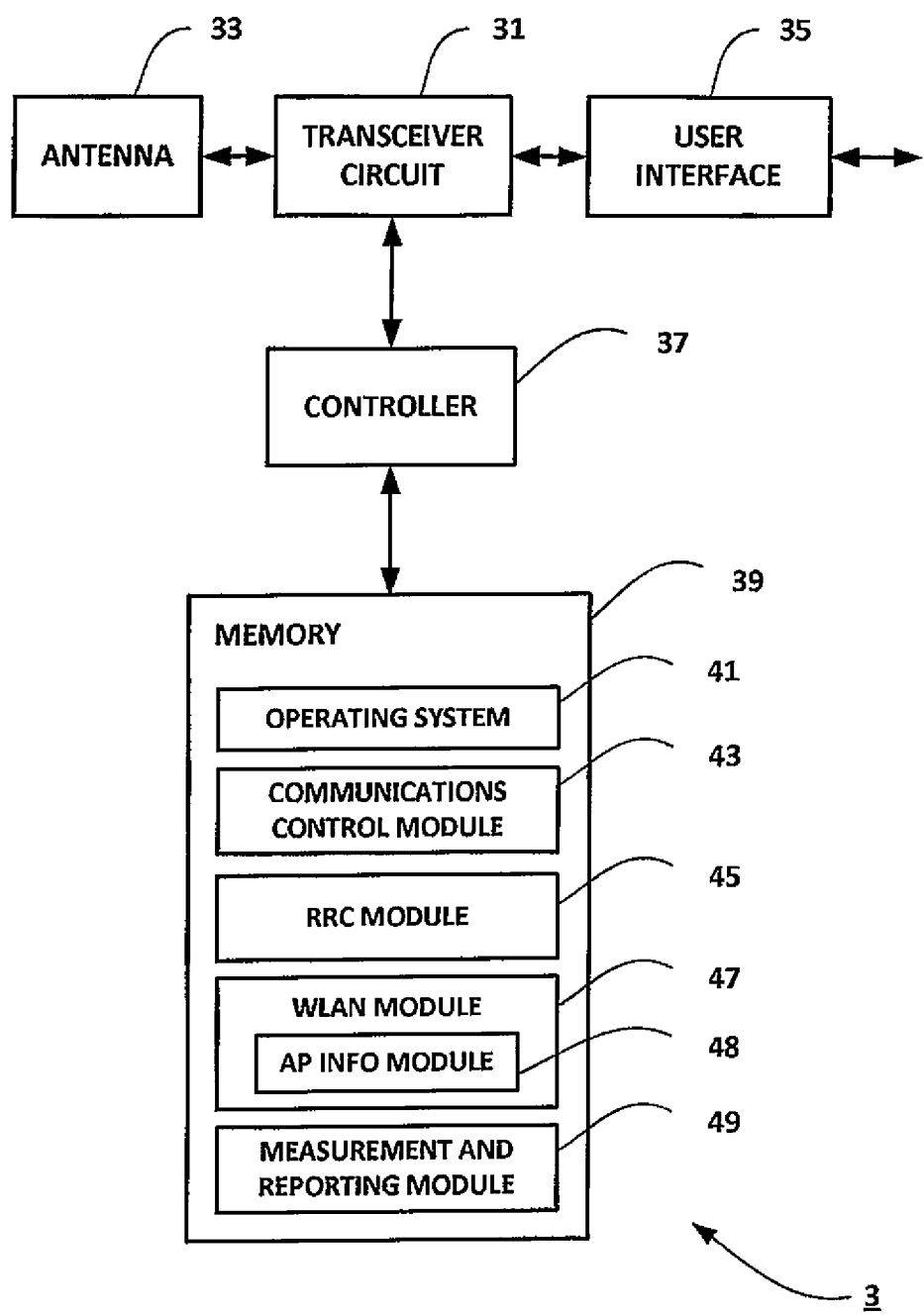

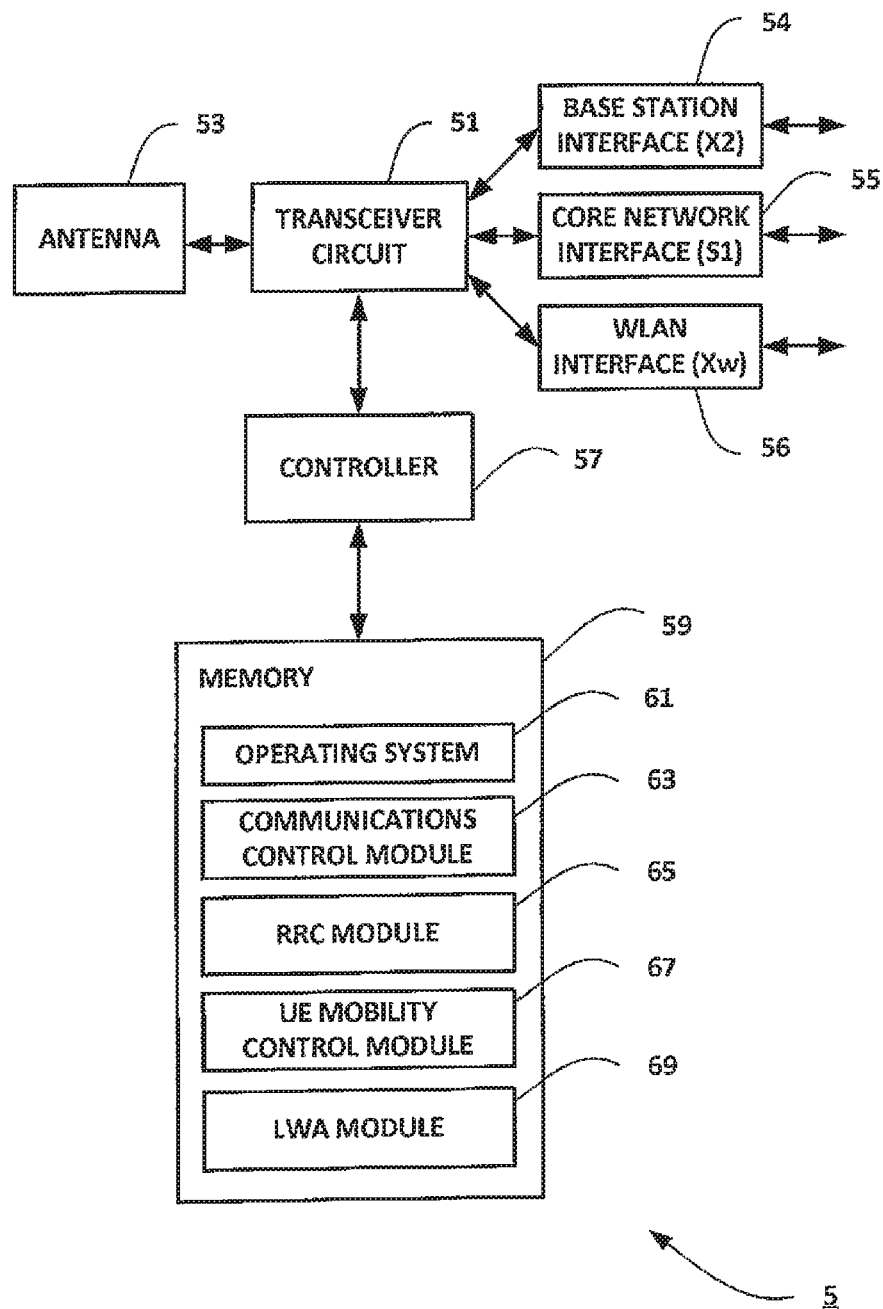
[Fig. 4]

[Fig. 5]
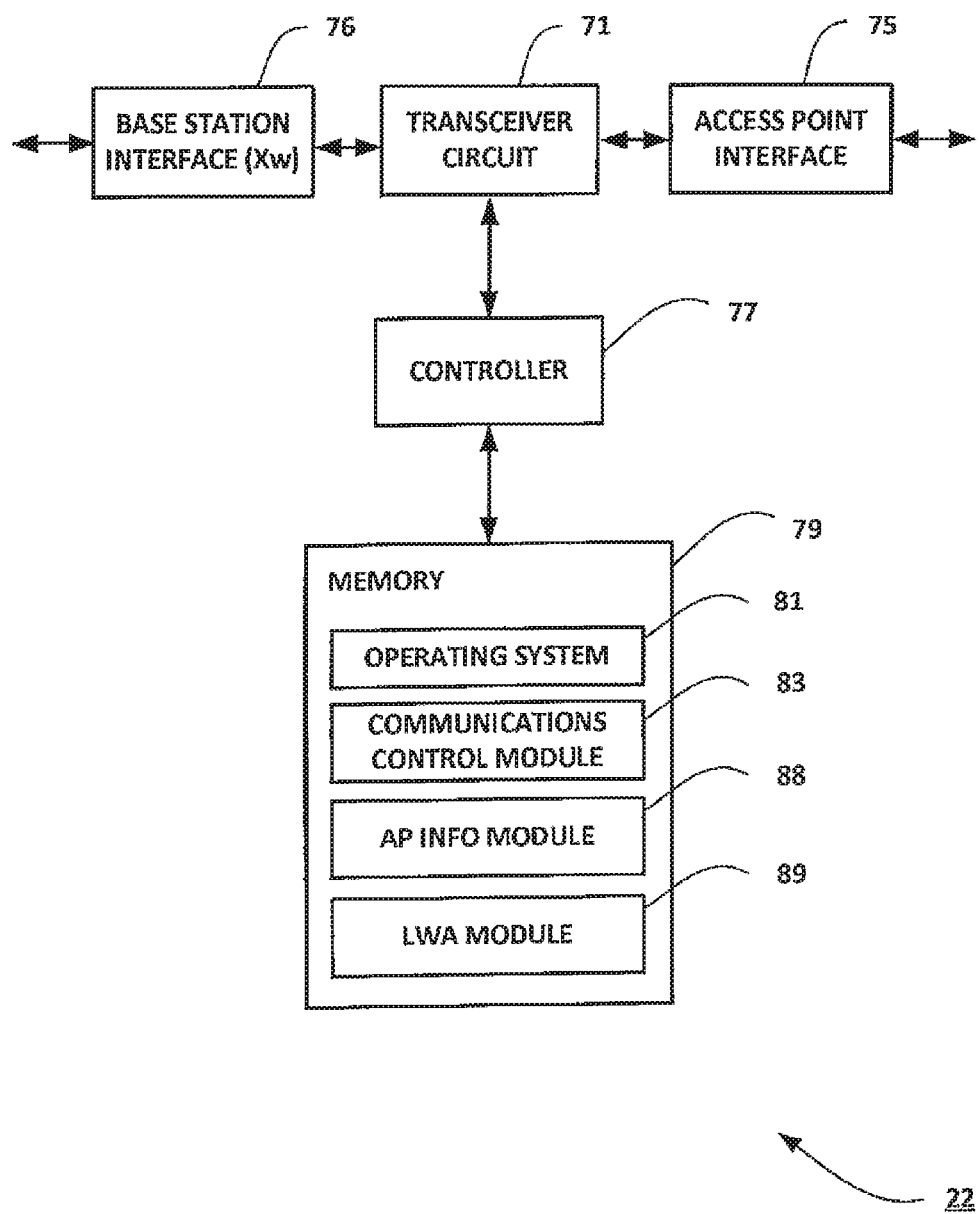

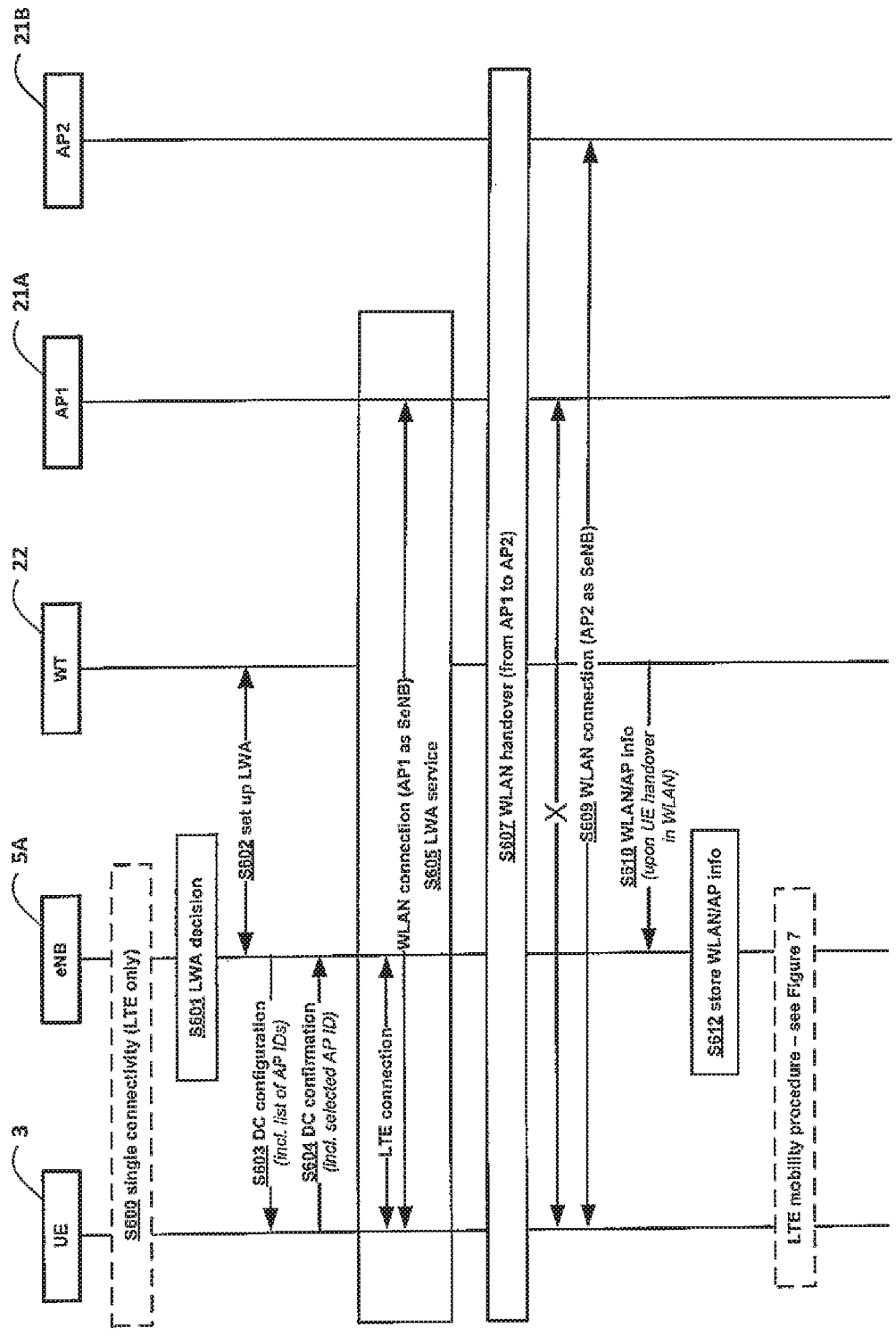

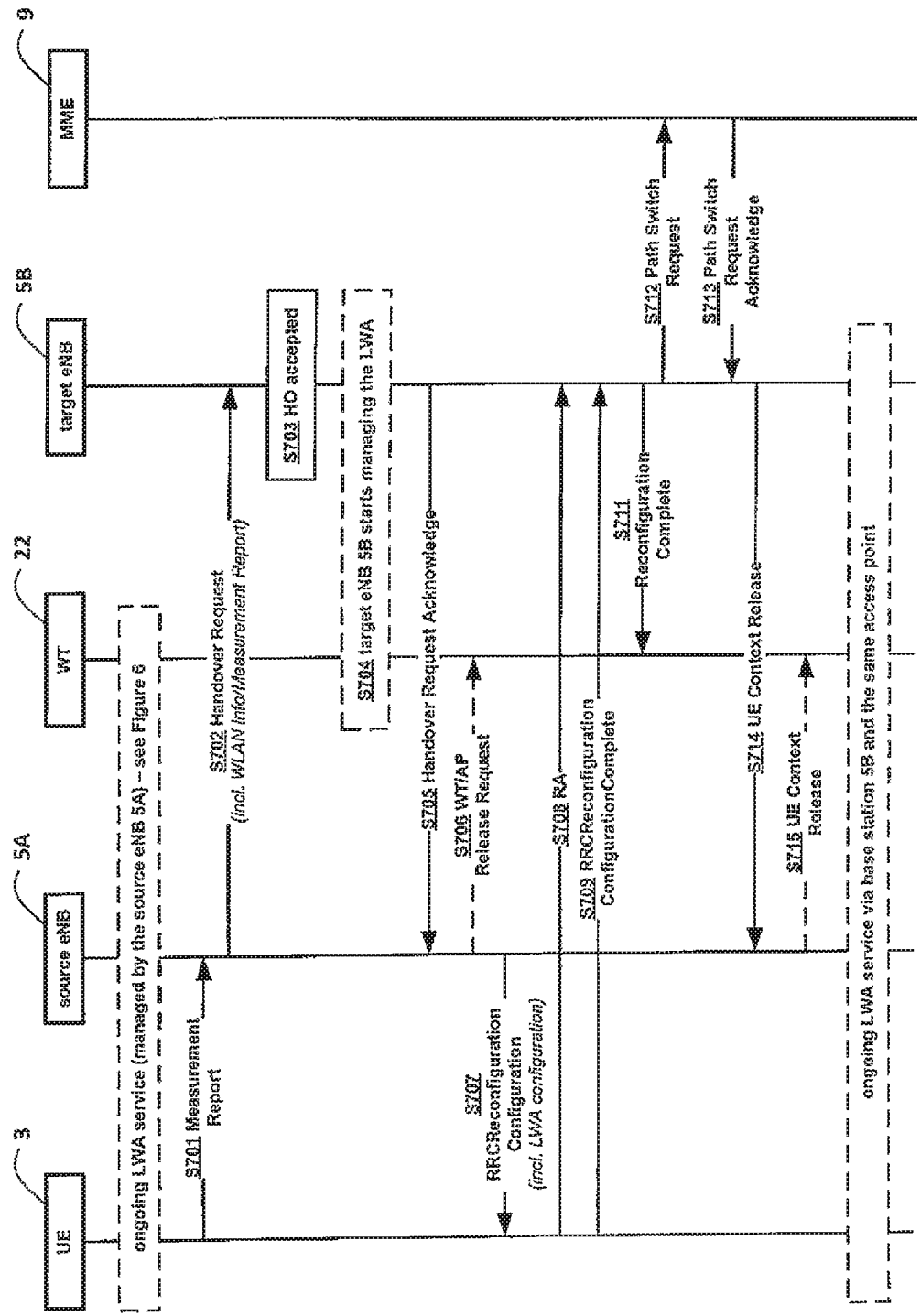
[Fig. 7]

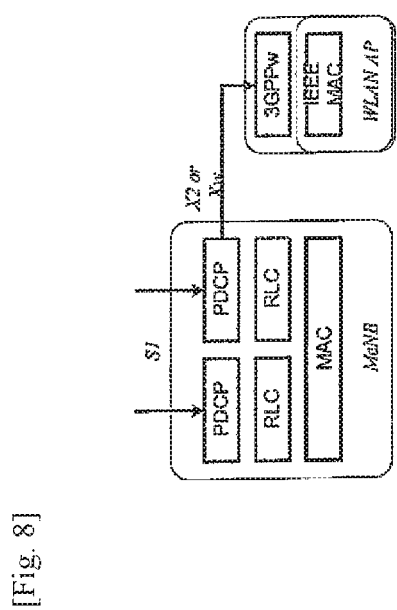
[Fig. 8]

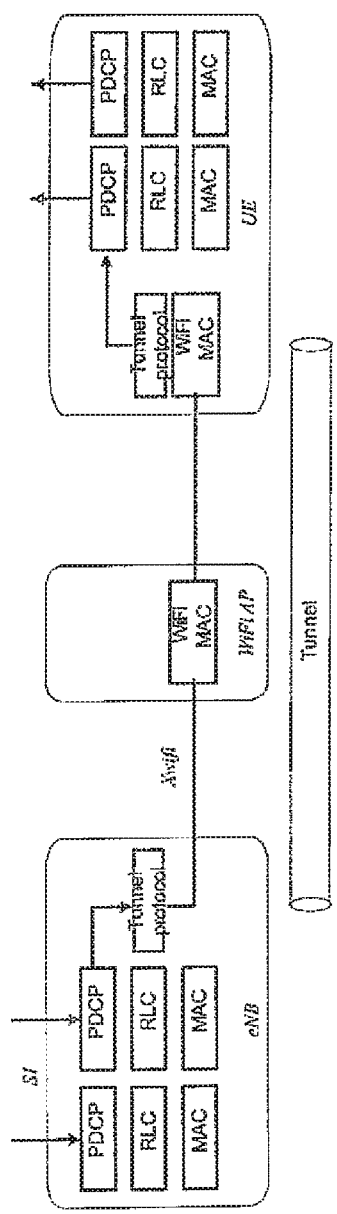
[Fig. 9]

SPLIT OF CONTROL- AND USER-PLAN DURING LTE-WLAN AGGREGATION HANDOVERS

CROSS REFERENCE TO RELATED APPLICATIONS

This application is a National Stage of International Application No. PCT/JP2016/003708 filed Aug. 10, 2016, claiming priority based on British Patent Application No. 1514539.4 filed Aug. 14, 2015, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to the controlling of interworking between different access technologies, such as the Long Term Evolution (LTE) of UTRAN (called Evolved Universal Terrestrial Radio Access Network (E-UTRAN)), including LTE-Advanced. and wireless local area networks (WLANs).

BACKGROUND ART

Under the 3GPP standards, a 'NodeB' (or an 'eNB' in LTE) is the base station via which mobile devices connect to a core network and communicate to other mobile devices or remote servers. For simplicity, the present application will use the term base station to refer to any such base stations. Communication devices might be, for example, mobile communication devices such as mobile telephones, smartphones, user equipment, personal digital assistants, laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile communication devices (or mobile devices) in the description but it will be appreciated that the technology described can be implemented on any mobile and "non-mobile" equipment that can connect to such a core network.

The latest developments of the 3GPP standards are referred to as the Long Term Evolution (LTE) of EPC (Evolved Packet Core) network and E-UTRA (Evolved UMTS Terrestrial Radio Access) network. LTE (and more recently LTE-Advanced, or 'LTE-A') makes it possible for User Equipment (UE), such as mobile devices to connect efficiently to the core network using alternative, non-3GPP radio access technologies (RAT) as well, for example, using the Wireless Local Area Network (WLAN) standard and the like. The supported access technologies are covered in the 3GPP TS 23.402 standards document (version 13.2.0) titled "Architecture enhancements for non-3GPP accesses".

3GPP technical report (TR) 36.875 V 13.0.0 describes a so-called 'LTE-WLAN aggregation' service for LTE UEs (which can also be referred to as 'dual radio connectivity'). LTE-WLAN aggregation (LWA) in this case refers to a scenario in which a compatible UE is served, concurrently, both by an LTE base station and a non-LTE base station (such as an access point of a WLAN). LWA may be configured for the UE by the LTE network (e.g. serving base station/E-UTRAN), depending on (measured) signal quality, network load, required quality of service (QoS), movement/location of the UE, and/or the like. The UE facilitates the setting up of an LWA service by providing WLAN measurements on a per access point basis to its serving base station. Based on this, the serving base station selects a number of candidate access points and sends a list identifying the candidate access points to the UE, which selects an access point from the list to provide, in effect, a secondary cell (SCell) for the LWA service. The UE informs the serving base station about its selection.

Once the UE is also connected to the WLAN, it may be handed over between access points of that WLAN, for example, in order to keep serving the UE via the base station that has the most optimum signal quality (for that UE) and/or in order to optimise WLAN performance.

However, when the UE is handed over to an access point that is located at the edge of a particular WLAN and/or at the edge of the cell of the LTE base station currently serving the UE, in some cases the UE may move outside the area served by the WLAN and/or the LTE base station before the serving base station has a chance to de-configure the LWA service for the UE. This may result in a loss of connection at either the WLAN (non-LTE) or the LTE part of the LWA service, and consequently, it may cause failure to meet the QoS required for the UE's communications.

Similarly, failure to meet the required QoS may also happen when the UE is handed over within the WLAN to an access point that is unable to provide the same QoS as the access point from which the handover takes place. In this case, the serving base station will be unable to de-configure (or update) the LWA service for the UE in time, i.e. prior to failure to meet the required QoS.

Furthermore, radio link failure (RLF) may occur on either the WLAN or the LTE part of the UE's LWA service, for example, due to adverse radio conditions such us unexpected interference and/or the like. If such an RLF occurs on the WLAN connection, the above described drawbacks apply (i.e. the LTE base station cannot act timely to maintain the required QoS). On the other hand, if an RLF occurs on the UE's LTE connection, the UE will try to re-establish its radio resource control (RRC) connection with the E-UTRAN, typically with the base station that has the best signal quality. However, in the event of an RLF of the current serving base station, the base station having the best signal quality is almost certainly a different base station to the base station managing the LWA service meaning that a potentially good connection with the WLAN will have to be dropped.

Moreover, as the UE is moving within the coverage of the E-UTRAN, it may be necessary to hand the UE over to a new serving base station. However, handover between (LTE) base stations also requires terminating any connectivity that involves the old serving base station (including termination of the associated WLAN connection of an LWA service) and setting up a new LWA service for the UE under the control of the new serving base station. The inventors have realised that this may result in unnecessary signalling between the UE and the serving base stations and also between the UE and the WLAN, especially when there would otherwise be no need to change the current WLAN access point because the quality of service it provides is sufficient.

SUMMARY OF INVENTION

Technical Problem

The handing of LWA for a UE when handover and/or radio link failure occurs, without compromising the required quality of service for the UE, degrading the user experience, and/or wasting network resources (especially on the air interface) is, therefore, a non-trivial problem.

Accordingly, preferred embodiments of the present invention aim to provide methods and apparatus which overcome or at least partially alleviate at least some of the above issues.

Although for efficiency of understanding for those of skill in the art, the invention will be described in detail in the context of a 3GPP system (UMTS, LTE), the principles of the invention can be applied to other systems in which mobile devices or User Equipment (UE) access the system using multiple access technologies.

Solution to Problem

In one aspect, the invention provides communication apparatus for providing communication access to a communication network, the communication apparatus comprising: a controller adapted to operate a communication cell; and a transceiver operable: to transmit control plane data to at least one communication device in said communication cell, wherein said control plane data facilitates user plane communication by the at least one communication device, via a first communication access point; and to receive, when said user plane communication has been handed over from said first communication access point to a second communication access point, information configured to identify said second communication access point.

In one aspect, the invention provides communication apparatus for providing communication access to a communication network, the communication apparatus being configured to operate as a target communication apparatus comprising: a transceiver operable: to receive, from source communication apparatus, handover request signalling for requesting handover of communication for a communication device, served by said source communication apparatus, said handover request signalling comprising access point identification information configured to identify a communication access point via which said communication device engages in user plane communication; and a controller adapted to manage handover of said communication for said communication device from the source communication apparatus to said target communication apparatus whilst maintaining said user plane communication via said communication access point identified by said access point identification information.

In one aspect, the invention provides communication apparatus for providing communication access to a communication network, the communication apparatus being configured to operate as a source communication apparatus comprising: a transceiver operable: to transmit, to target communication apparatus, handover request signalling for requesting handover of communication for a communication device, served by said source communication apparatus, said handover request signalling comprising access point identification information configured to identify a communication access point via which said communication device engages in user plane communication.

In one aspect, the invention provides communication apparatus for a wireless local area network, WLAN, comprising a plurality of communication access points configured to provide user plane communication to at least one communication device, the communication apparatus comprising: a controller operable: to obtain, when said user plane communication has been handed over from a first communication access point to a second communication access point, information configured to identify said second communication access point; and a transceiver operable: to transmit, to communication apparatus of another communication network providing user plane communication to said at least one communication device, information identifying said second communication access point.

In one aspect, the invention provides a communication device comprising: a transceiver operable to establish: i) a control plane connection with a first radio access network (RAN), via a base station of said first RAN; ii) a first user plane connection via said first base station; and iii) a second user plane connection via an access point of a second RAN; and a processor operable to determine that said transceiver needs to re-establish said control plane connection and/or said first user plane connection with said first RAN; wherein said transceiver is operable to maintain said second user plane connection at least until completion of said radio connection re-establishment via the first RAN.

In one aspect, the invention provides a communication device comprising: a transceiver operable to establish: a control plane connection with a radio access network (RAN), via a base station of said first RAN; a first user plane connection via said base station; and a second user plane connection via a first communication access point of a second RAN; wherein said transceiver is operable to send, to said base station and responsive to said user plane communication being handed over from said first communication access point to a second communication access point of said second RAN, information configured to identify said second communication access point.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described, by way of example, with reference to the accompanying drawings in which:

BRIEF DESCRIPTION OF DRAWINGS

FIG. 1 illustrates schematically a cellular telecommunication system to which exemplary embodiments of the invention may be applied;

FIG. 2 illustrates schematically a number of exemplary mobility scenarios for LTE-WLAN aggregation;

FIG. 3 is a block diagram of a mobile device forming part of the system shown in FIG. 1;

FIG. 4 is a block diagram of a base station forming part of the system shown in FIG. 1;

FIG. 5 is a block diagram of a WLAN termination node forming part of the system shown in FIG. 1;

FIG. 6 is an exemplary timing diagram indicating procedures relating to an LTE-WLAN aggregation service;

FIG. 7 is an exemplary timing diagram indicating a handover between two base stations whilst maintaining an existing WLAN termination;

FIG. 8 is a block diagram illustrating schematically an exemplary LTE-WLAN aggregation architecture with an adaptation layer; and FIG. 9 is a block diagram illustrating schematically an exemplary tunnel based LTE-WLAN aggregation architecture.

DESCRIPTION OF EMBODIMENTS

<Overview>

FIG. 1 schematically illustrates a mobile (cellular) telecommunication network 1 in which users of mobile devices 3 can communicate with each other and other users via E-UTRAN base stations 5 and a core network 7 using an E-UTRA radio access technology (RAT). As those skilled in the art will appreciate, whilst one mobile device 3 and two base stations 5A, 5B are shown in FIG. 1 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunication system 1. In order to keep track of the mobile device 3 and to facilitate movement between the different base stations 5, the core network 7 comprises a mobility management entity (MME) 9 which is in communication with the base stations 5 coupled to the core network 7. The core network 7 also comprises an HSS (not shown in FIG. 1), and one or more gateways 10, such as a serving gateway (S-GW) and/or a packet data network gateway (P-GW). For each mobile device 3, the HSS stores relevant subscription data (such as settings and subscription data required for the 3GPP subscriber to access the network 1).

The mobile device 3 and its serving base station (in this example, base station 5A) are connected via an LTE air interface, the so-called "Uu" interface. The base stations 5 are connected to each other via a so-called "X2" interface. Each base station 5 is also connected to the core network 7 nodes (i.e. the MME 9 and the S-GW 10) via a so-called "S1" interface. From the core network 7, connection to an external IP network 12, such as the Internet, is also provided via the gateway 10 (e.g. P-GW). Although not shown in FIG. 1, the MME 9 is also connected to the HSS and the gateway(s) 10 via respective 3GPP interfaces.

In this system, the mobile device 3 can also connect to a WLAN 20, via an access point (AP) 21 (in this example, access point 21A) of the WLAN 20, when in the coverage area of that access point 21. When connected to the WLAN 20, the mobile device 3 and the access point 21 communicate with each other using an appropriate WLAN (i.e. 'non-LTE') air interface, for example, an air interface according to the 802.11 family of standards defined by the Institute of Electrical and Electronics Engineers (IEEE) and/or the like.

In this example, the access points 21A, 21B are coupled to the base station 5 via a WLAN termination (WT) node 22 (although the access points 21 might be coupled to the base station 5 directly and/or the functionalities of the access point and the WLAN termination node might be implemented in a single network node). The WLAN termination node 22 and the base stations 5 are connected via respective interfaces, for example, the so-called "Xw" interface, which is discussed in section 5.1.2.3 of 3GPP TR 37.870 V 13.0.0, the contents of which are incorporated herein by reference. It will be appreciated that the Xw interface may be provided using an appropriate GPRS Tunneling Protocol (GTP) tunnel (and/or the like) for assisting the interworking between the LTE network and the non-LTE radio access network (WLAN 20). Although not shown in FIG. 1, the WLAN termination node 22 and/or the access points 21 might also be coupled to the external IP network 12 (e.g. the Internet) and/or to the core network 7.

The WLAN termination node 22 performs management of interworking between the WLAN 20 and the serving base station 5, such as authorisation and authentication of the connected or participating WLAN devices, allocation and sharing of WLAN resources, and other services like packet broadcast or power saving control. Such interworking also includes the aggregation of LTE and non-LTE radio resources for the provision of an LWA service for the mobile device 3.

Initially, the mobile device 3 is served by the base station 5A and has established a communication bearer to the core network 7 via that base station 5A. However, in order to optimise network load or similar reasons, the serving base station 5A is capable of steering (at least some of) the user plane traffic of the mobile device 3 to the WLAN 20. In order to support such steering, the base station 5 is able to configure the mobile device 3 to perform measurements of the WLAN signals (i.e. signals of the access points 21), and to provide associated measurement report(s), to allow the base station 5 to select an appropriate access point 21 (or a set of access points) for attempting to offload the mobile device's 3 user plane communications to (at least partially).

The mobile device 3 shown in FIG. 1 is configured for using an LWA service, thus it can communicate, concurrently, via a base station (in this example base station 5A) and an access point (in this example access point 21B). The access point 21B involved in the LWA service is selected (either by the mobile device 3 or its serving base station 5A), for example, based on the WLAN measurement reports. If the mobile device 3 selects the access point, then it may inform its serving base station 5A about its initial access point selection (e.g. in a message confirming that the LWA service has been successfully set up).

However, once the mobile device 3 is connected to the WLAN 20, it may be handed over between access points 21A, 21B of the WLAN 20, depending on (measured) signal quality, network (WLAN) load, required quality of service, movement of the mobile device 3, and/or the like.

Advantageously, the WLAN termination node 22 is configured to inform the serving base station 5A whenever such handover occurs between access points 21 any time after the mobile device's 3 initial connection to the WLAN 20. The WT 22 does so by sending information to the serving base station 5A about the mobile device's 3 current WLAN connection (e.g. information identifying the current access point). Beneficially, using the received WLAN information, the serving base station 5A can keep track of the mobile device's 3 currently used access point 21 and, if necessary, request the mobile device 3 and/or the WLAN termination node 22 to re-configure (at least the WLAN part of) the LWA service. The received WLAN information provided by the WLAN termination node 22 may also include additional information about the mobile device's 3 current WLAN connectivity. Such additional WLAN information may include, although not limited to: WLAN channel utilization; WLAN backhaul data rate; WLAN signal strength; WLAN identifier; WLAN AP availability; a basic service set (BSS)

average access delay/BSS AC access delay; the mobile device's 3 current WLAN configuration (e.g. QoS); and/or the like.

As the mobile device 3 is moving around in the geographical area covered by the telecommunication system 1 (as illustrated by arrows in FIG. 1), it may need to carry out appropriate mobility procedures with the E-UTRAN as well. Beneficially, in this system, the serving base station 5A (acting as a source base station) is configured to inform the handover target base station (in this case, the base station 5B) about the mobile device's 3 currently used access point 21 and/or any information relating to the mobile device's 3 current WLAN connection that it has received from the WLAN termination node 22 (but in any case, at least information identifying the current access point).

Using the information relating to the mobile device's 3 WLAN connection, the target base station 5B is advantageously able to determine whether or not to maintain the LWA service for the mobile device 3, and if the LWA service is maintained, the target base station 5B is able to determine whether to keep the current access point 21B or to select a new one for the mobile device 3 (e.g. based on appropriate measurements).

Similarly, if the mobile device 3 needs to re-establish its RRC connection with the E-UTRAN, e.g. due to a radio link failure, the new serving base station (if different) is able to obtain the information relating to the mobile device's 3 existing WLAN connection from the old serving base station 5A (over the X2 interface). This is possible, because when the mobile device 3 requests re-establishment of the RRC connection, it includes information identifying its last serving base station 5A, and (as part of the RRC connection re-establishment procedure) the old serving base station 5A provides information to the new serving base station 5B about the mobile device's 3 ongoing connections (up until the radio link failure).

It is therefore not necessary for the new serving base station 5B to release the mobile device's 3 existing LWA service (if any) and configure a new one in case of a handover or a radio link failure, which improves service continuity for the mobile device 3 and which is less wasteful of system resources.

An additional benefit is that even during a base station to base station handover, or during a radio like failure affecting the Uu interface, the mobile device 3 is able to maintain at least its WLAN connectivity until it is able to re-establish its connection to the (new or old) LTE base station 5A, 5B.

<Handover Scenarios with LTE-WLAN Aggregation in Place>

Before describing particularly advantageous embodiments in detail, a brief overview of mobility scenarios is given in case of LTE-WLAN aggregation, with reference to FIG. 2.

Specifically, FIG. 2 illustrates two exemplary mobility scenarios in LWA (i.e. when the mobile device 3 is connected to both an LTE network and a non-LTE network).

In Scenario 1, the base stations denoted 'eNB1' and 'eNB2' comprise LTE base stations (such as the base stations 5A, 5B of FIG. 1), and the node denoted 'WT/AP' comprises a non-LTE access point (such as an access point 21A, 21B shown in FIG. 1). In Scenario 2, the base stations denoted 'eNB1' and 'eNB2' comprise LTE base stations, and the nodes denoted 'WT/AP' comprise non-LTE access points.

In both scenarios shown in FIG. 2, the mobile device 3 performs handover from a first LWA configuration to a second LWA configuration.

However, in scenario 1, the mobile device 3 is in an LWA service with the first base station 5A and an access point 21, and then it is handed over to the second base station 5B whilst maintaining the mobile device's 3 WLAN connection to its current access point 21. Accordingly, the handover in scenario 1 affects the mobile device's 3 LTE connection only, and the second base station 5B keeps the same access point 21 for the mobile device 3 after the handover. In other words, scenario 1 is equivalent to an LTE handover without access point change.

On the other hand, in scenario 2, the mobile device 3 is initially in an LWA service with the first base station 5A and the access point 21A, and then it is handed over to the second base station 5B whilst also changing the mobile device's non-LTE connection to a different access point 21B. Accordingly, the handover in scenario 2 affects both the mobile device's 3 LTE connection and its non-LTE connection. In other words, scenario 2 is equivalent to an LTE handover with access point change.

<Mobile Device>

FIG. 3 is a block diagram illustrating the main components of the mobile device 3 shown in FIG. 1. As shown, the mobile device 3 has a transceiver circuit 31 that is operable to transmit signals to and to receive signals from a base station 5 and to transmit signals to and to receive signals from an access point 21 via one or more antenna 33. The mobile device 3 has a controller 37 to control the operation of the mobile device 3. The controller 37 is associated with a memory 39 and is coupled to the transceiver circuit 31. Although not necessarily shown in FIG. 3, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, an RRC module 45, a WLAN module 47, and a measurement and reporting module 49.

The communications control module 43 controls the communication between the mobile device 3 and the base station 5 and between the mobile device 3 and the access point 21. The communications control module 43 also controls the separate flows of control data and user data (for uplink and downlink) that are to be transmitted to the base station 5 and/or the access point 21.

The RRC module 45 sends and receives messages according to the RRC protocol, via the transceiver circuit 31 including, for example, the RRC messages comprising control data for configuring signal measurements (with respect to one or more base stations/access points) and/or reporting the results of such signal measurements. The RRC module 45 is also responsible for sending and receiving messages relating to handover and/or (re-)establishment of a radio connection with the E-UTRAN (for example, messages relating to a random access procedure, RRC Reconfiguration messages, and/or the like).

The WLAN module 47 controls communication via the access points 21 based on the information stored in the memory 39 of the mobile device 3 and/or based on information received from the base station 5 (e.g. in an RRC or other message) and/or an access node 21. The WLAN module 47 also includes an access point information module 48 portion that is configured to provide, to the base station 5 (via the RRC module 45), information identifying the current (selected) access point 21 serving the mobile device 3 (as part of an LWA service).

The measurement and reporting module 49 receives control data (e.g. via the RRC module 45 using appropriate RRC signalling) for configuring signal measurement with respect to radio access networks in the vicinity of the mobile device 3, such as the WLAN 20 (comprising the access points 21A, 21B) and/or an E-UTRAN comprising the base stations 5A, 5B. The measurement and reporting module 49 performs signal quality/strength measurements in accordance with the received configuration and generates and sends the base station 5 (e.g. via the RRC module 45) a report including the results of such measurements, as specified in the received control data.

<Base Station>

FIG. 4 is a block diagram illustrating the main components of one of the base stations 5 shown in FIG. 1. As shown, the base station 5 has a transceiver circuit 51 for transmitting signals to and for receiving signals from the mobile devices 3 via one or more antenna 53, a base station interface (X2) 54 for transmitting signals to and for receiving signals from other base stations, a core network interface (S1) 55 for transmitting signals to and for receiving signals from the core network entities (e.g. the MME 9 and the gateway 10), and a WLAN interface (Xw) 56 for transmitting signals to and for receiving signals from the WLAN termination node 22 (and access points 21A, 22A connected thereto). The base station 5 has a controller 57 to control the operation of the base station 5. The controller 57 is associated with a memory 59. Although not necessarily shown in FIG. 4, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, an RRC module 65, a UE mobility control module 67, and an LTE-WLAN aggregation (LWA) module 69.

The communications control module 63 controls the communication between the base station 5 and the mobile device 3 and other network entities that are connected to the base station 5. The communications control module 63 also controls the separate flows of uplink/downlink user traffic and control data to be transmitted to the mobile devices 3 associated with this base station 5 including, for example, control data for measurement configuration and maintenance of the bearers for a mobile device 3 (including single and LWA connectivity bearers).

The RRC module 65 is operable to generate, send and receive signalling messages formatted according to the RRC standard. For example, such messages are exchanged between the base station 5 and the mobile devices 3 that are associated with this base station 5. The RRC messages may include, for example, the RRC messages comprising control data (from the UE mobility control module 67) for requesting the mobile device 3 to measure signals of one or more particular base station 5 and/or access point 21. The RRC module 65 is also responsible for sending and receiving messages relating to handover and/or (re-) establishment of a radio connection between the mobile device 3 and the E-UTRAN (for example, messages relating to a random access procedure, RRC Reconfiguration messages, and/or the like).

The UE mobility control module 67 configures the mobile telephones 3 associated with this base station 5 for carrying out procedures relating to mobility (such as cell selection and handover). Such procedures include signal measurements with respect to various radio access networks, such as the E-UTRAN and the WLAN 20. The UE mobility control module 67 sends the mobile device 3 control data (e.g. via the RRC module 65 using appropriate RRC signalling) specifying the type of measurements to be carried out by the mobile device 3 and the conditions for reporting the results of these measurements. In case of a handover, and if there is an active LWA service for the mobile device 3, the UE mobility control module 67 sends control data to the mobile device 3 specifying the access point 21 (or a list of candidate access points) for using for the LWA service.

The LTE-WLAN aggregation module 69 controls and maintains the selection of an access point 21 for providing LWA for the mobile telephone 3. The LTE-WLAN aggregation module 69 relies on the signal measurement reports from the mobile device 3 and also takes into account any WLAN aggregation information provided by the WLAN termination node 22. The LTE-WLAN aggregation module 69 is operable to provide such WLAN aggregation information to other base stations, for example, as part of a handover and/or (RRC) connection establishment procedure.

<WLAN Termination Node>

FIG. 5 is a block diagram illustrating the main components of the WLAN termination node 22 shown in FIG. 1. As shown, the WLAN termination node 22 has a transceiver circuit 71, an access point interface 75 for transmitting signals to and for receiving signals from the access points 21, and a base station interface (Xw) 76 for transmitting signals to and for receiving signals from the base stations 5. The WLAN termination node 22 has a controller 77 to control the operation of the WLAN termination node 22. The controller 77 is associated with a memory 79.

Software may be pre-installed in the memory 79 and/or may be downloaded via the communication network 1 or from a removable data storage device (RMD), for example. The controller 77 is configured to control the overall operation of the WLAN termination node 22 by, in this example, program instructions or software instructions stored within memory 79. As shown, these software instructions include, among other things, an operating system 81, a communications control module 83, an AP information module 88, and an LTE-WLAN aggregation module 89.

The communications control module 83 controls the communication between the WLAN termination node 22 and other network entities that are connected to the WLAN termination node 22 (e.g. the base stations 5, the access points 21, and any mobile devices 3 when connected to the WLAN 20). The communications control module 83 also controls communications (and handovers) between the access points 21 and connected mobile devices 3 based on information stored in the memory 79 and/or based on information received from the base station 5, the access points 21, and/or the connected mobile devices 3.

The AP information module 88 is configured to provide, to the base station 5 (via the base station interface 76), information identifying the current access point 21 serving the mobile device 3. Specifically, the AP information module 88 is configured to provide the information identifying the current access point 21 upon the mobile device 3 performing a handover between access points 21 associated with this WLAN termination node 22. The AP information module 88 also provides WLAN aggregation information relating to the mobile device's 3 LWA service to the base station 5 managing the LWA service.

The LTE-WLAN aggregation module 89 controls the setting up and maintenance of the WLAN connection part of a LWA service for a mobile device 3 connected to the WLAN 20.

In the above description, the mobile device 3, the base station 5, and the WLAN termination node 22 are described for ease of understanding as having a number of discrete modules (such as the AP information modules and the LTE-WLAN aggregation module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different exemplary embodiments will now be described that illustrate how different aspects of the invention can be put into effect using the above mobile device 3, base stations 5, and WLAN termination node 22. The exemplary embodiments will be described with reference to the signalling (or 'timing') diagrams shown in FIGS. 6 and 7.

<Operation—LWA and WLAN Mobility>

FIG. 6 is an exemplary timing diagram indicating procedures relating to an LTE-WLAN aggregation service. Specifically, FIG. 6 illustrates how LWA is initially configured for the mobile device 3 shown in FIG. 1, and the steps performed when the mobile device 3 is handed over between access points 21 of the WLAN 20.

As generally illustrated in step S600, the mobile device 3 initially has a single (LTE) connection with the network (i.e. via the first base station 5A acting as a serving base station for the mobile device 3).

However, in step S601, the serving base station 5A decides that an LWA service needs to be configured for the mobile device 3, for example, based on current signal quality, network load, QoS required by the mobile device 3, movement/location of the mobile device 3, and/or the like. Accordingly, the serving base station 5A (using its LWA module 69) requests the WLAN termination node 22 to prepare for setting up, in step S602, an appropriate communication path for the LWA service (e.g. set up an appropriate tunnel between the WLAN termination node 22 and the serving base station 5A).

Then, the serving base station 5A proceeds to generate (using its RRC module 65) and send, in step S603, an appropriately formatted signalling message for configuring the LWA service for the mobile device 3. The serving base station 5A includes in its message information (e.g. a list) identifying a set of access points 21 from which the mobile device 3 can select an access point (or information identifying a specific access points 21 to be used by the mobile device 3) for the non-LTE part of the LWA service. It will be appreciated that the information identifying an access points may comprise any suitable identifier, such as an access point ID, a media access control address (MAC) address, an internet protocol (IP) address, and/or the like.

Next, e.g. following an appropriate authentication and connection establishment procedure with the WLAN 20, the mobile device 3 generates (using its RRC module 45) and sends, in step S604, an appropriately formatted signalling message to the serving base station 5A, confirming that the LWA service has been successfully configured via the access point 21A. Therefore, as generally illustrated in step S605, the mobile device 3 now has an active connection with both the LTE base station 5A and the WLAN access point 21A, using which it can send and receive data to other nodes.

However, following the initial establishment of the LWA, the mobile device 3 may need to perform a handover within the WLAN 20. Such a handover is controlled by the WLAN termination node 22, and it is generally illustrated in step S607. In this example, the mobile device 3 is handed over from its old access point 21A to a new access point 21B, which, effectively, results in termination of the mobile device's 3 exiting WLAN connection via the old access point 21A, and establishment of a new WLAN connection (shown in step S609) for the mobile device 3 via the new access point 21B acting as a new access point for the LWA service. The WLAN connection provided via the new access point 21B now forms part of the mobile device's 3 LWA together with the LTE connection established in step S605.

Beneficially, the WLAN termination node 22 is configured to generate (using its AP information module 88) and send, in step S610, an appropriately formatted signalling message (e.g. an Xw signalling message) informing the serving base station 5A about the mobile device's 3 WLAN handover. The WLAN termination node 22 includes in this message information identifying the newly selected access point 21B (e.g. its associated access point ID), and optionally, any further WLAN information (related to the mobile device 3) that may be useful for the base station 5A responsible for the LWA service. Such further WLAN information may include one or more of: information identifying a WLAN channel utilization; information identifying a WLAN backhaul data rate; information identifying a WLAN signal strength; information identifying the WLAN; information identifying an access point availability (per access point); information identifying a BSS Average Access Delay; information identifying a BSS AC Access Delay; and information identifying the mobile device's 3 current WLAN configuration (e.g. QoS).

In step S612, the serving base station 5A stores (in the memory 59) the WLAN information received from the WLAN termination node 22. The WLAN information advantageously enables the LTE base station 5A to be aware of the QoS and/or throughput offered in each access point 21 and (along with the information identifying the current access point 21B) use this information in its decision on whether or not to maintain the LWA service for the mobile device 3. Therefore, the base station 5A is able to keep track of the mobile device 3 within the WLAN 20 and it is able to reduce the risk of the LWA not meeting the required QoS.

For example, if based on the WLAN information obtained from the WLAN termination node 22, the serving base station 5A determines that the mobile device's 3 current LWA service does not meet the required QoS (and/or the like) or it determines that the mobile device 3 is currently connected to an access point that is located at the edge of the WLAN's 20 or the base station's 5A service area, then it returns to step S603 and provides updated configuration for the mobile device 3. For example, such updated configuration may comprise a request to use a different access point/base station combination or a request to terminate the current LWA service (and continue communicating via the LTE base station only). It will be appreciated that the serving base station 5A may request the mobile device 3 to carry out signal measurements (with respect to one or more base stations/access points) prior to providing such updated configuration to the mobile device 3.

Alternatively, the serving base station 5A (instead of or in addition to re-configuring the mobile device 3) might request the WLAN termination node 22 to exclude (or to include) a certain access point (based on its AP ID) if, for example, the QoS requirement is not met for the LWA service.

Moreover, using the WLAN information obtained from the WLAN termination node 22, the serving base station 5A is also able to assist other LTE base stations as well, for example, when performing a handover for the mobile device 3. This procedure is described below with reference to FIG. 7.

<Operation—LWA and LTE Mobility>

FIG. 7 is an exemplary timing diagram indicating a handover between two base stations 5 whilst maintaining an existing WLAN termination for LWA. Specifically, in this example, the mobile device 3 performs a handover from base station 5A as a source eNB to base station 5B as a target eNB without changing the mobile device's 3 connection to the WLAN 20 (e.g. via AP 21B of FIG. 1).

As shown, the mobile device 3 may be initially configured for LWA (e.g. as described above with reference to FIG. 6).

The procedure begins in step S701, in which the mobile device 3 (using its measurement and reporting module 49) generates and sends an appropriately formatted measurement report to its serving base station 5A (denoted 'source eNB' in FIG. 7). In this case, the serving base station 5A determines (using its UE mobility control module 67) that a handover is needed for the mobile device 3.

Therefore, the serving base station 5A generates and sends, in step S702, an appropriately formatted signalling message to the target base station 5B requesting handover of the mobile device 3 to a cell of the target base station 5B. The source base station 5A also includes in this message any WLAN information obtained from WLAN termination node 22 and/or the mobile device 3 (at least the AP ID associated with the mobile device's 3 current access point) and/or the measurement report obtained from the mobile device 3. The source base station's 5A message at S702 (or a subsequent message, e.g. in step S704) may also include any information obtained from the mobile device 3 (such as measurement report(s) for the base stations/access points) and/or any information obtained from the WLAN termination node 22 (such as GTP tunnel endpoint information; AP ID; measurements including e.g. channel utilisation, backhaul rate, etc).

If the target base station 5B accepts (in step S703) the handover request based on the received information (and it decides to configure or maintain LWA for the mobile device 3), it proceeds to step S704 (otherwise it rejects the handover request by sending an appropriate response to the source base station 5A).

As generally shown step S704, from this point on the target base station 5B is responsible for managing the LWA service for the mobile device 3, and configures the LWA service (and/or terminates it) as appropriate. Therefore, the target base station 5B establishes a connection with the WLAN termination node 22 (replacing the connection between the source base station 5A and the WLAN termination node 22 for the mobile phone's 3 LWA service). Since the mobile device 3 was already in an LWA service using the access point 21B (and the source base station 5A) before the handover, the target base station 5B may also identify the access point 21B for the WLAN termination node 22 (e.g. by providing information identifying the access point 21B and/or a UE context in the access point 21B that was established by the source base station 5A).

It will be appreciated, however, that the target base station 5B may select a different access point 21 (e.g. access point 21A of FIG. 1) than the one currently used by the mobile device 3. The target base station 5B may also identify, e.g. in step S704 or in a subsequent step, a set of candidate access points (identified by their respective AP IDs), from which the WLAN termination node 22 selects an appropriate access point for the mobile device's 3 LWA service after the handover.

Next, in step S705, the target base station 5B replies to the source base station's 5A handover request message (received at step S702a) with an appropriately formatted acknowledgement message (e.g. a 'Handover Request Acknowledge' message).

In step S706, optionally, the source base station 5A may request the WLAN termination node 22 (or the access point 21B) to release the access point currently associated with the source base station 5A, by sending an appropriately formatted release request message towards WLAN termination node 22 (or the access point 21B). However, it will be appreciated that the access point 21B may be released (for the source base station 5A) when the target base station 5B starts managing the LWA service (e.g. in step S704).

Next, the source base station 5A (using its RRC module 65) requests the mobile device 3 to initiate a radio connection establishment procedure with the target base station 5B, by generating and sending, in step S707, an appropriately formatted signalling message to the mobile device 3 (e.g. an 'RRC Reconfiguration' message and/or a 'Handover Command' message). In this example, beneficially, the RRC message also includes the necessary information (e.g. LWA configuration identifying the target base station 5B) identifying the new serving base station 5B for providing the LWA service to the mobile device 3.

In step S708, the mobile device performs a random access procedure with the target base station 5B identified in step S707. If the random access procedure is completed successfully, the mobile device 3 confirms, in step S709, that the RRC reconfiguration is completed by generating (using its RRC module 45) and sending an appropriate signalling message to the target base station 5B (e.g. an 'RRCConnectionReconfigurationComplete' message).

Upon completion of the RRC connection reconfiguration procedure, the target base station 5B also confirms, in step S711, to the WLAN termination node 22 that the LWA reconfiguration using the target base station 5B as the new LTE base station but maintaining user plane communication via the same access point is complete.

Next, the target base station 5B generates and sends, in step S712, a 'Path Switch Request' to the MME 9, requesting the MME 9 to switch the bearers (from the source base station 5A to the target base station 5B).

In step S713, the MME 9 performs the path switch and confirms the path switch request, by sending a 'Path Switch Request Acknowledge' message to the target base station 5B. In response to this message, the target base station 5B sends, S714, an appropriate request (e.g. a 'UE Context Release' message) to the source base station 5A to request the source base station 5A to release the UE context associated with the mobile device 3 (which has now been successfully handed over to the target base station 5B).

Optionally, as generally shown in step S715, the source base station 5A may also request the WLAN termination node 22 (or the access point 21B) to release the UE context associated with the source base station 5A for the mobile device 3, by sending an appropriately formatted 'UE Context Release' message towards the WLAN termination node 22.

Beneficially, therefore, if the mobile device is involved in LWA (via the WLAN and the LTE network concurrently), then there is no need to terminate the LWA service (and re-start it by the new base station) when the mobile device performs a handover between LTE base stations. This results in a more efficient usage of the LTE (and WLAN) radio resources.

<Operation—Radio Link Failure>

As explained above, a radio link failure may occur on the LTE part of the UE's LWA service, for example, due to adverse radio conditions such as unexpected interference and/or the like. If such radio link failure occurs on the mobile device's 3 connection with its serving base station 5A, the mobile device 3 tries to re-establish its RRC connection with the E-UTRAN, typically with the base station having the best measured signal quality (i.e. either its current serving base station or a different base station).

However, assuming that the frequency bands and/or access technologies used in the WLAN 20 and in the LTE network are likely to be different, the mobile device's WLAN connection is not necessarily affected by the radio link failure associated with the LTE base station. Thus, in the case of a radio link failure occurring on the LTE part of the LWA service, there are two options to handle the corresponding WLAN connectivity for the mobile device 3.

Option 1

In case of an RRC connection re-establishment, there may be a need to remove or reconfigure the mobile device's 3 WLAN connectivity (which may be added again by the new serving base station, if appropriate). This option is similar to the handling of a radio link failure during carrier aggregation (CA) in LTE.

However, in this case, the serving base station 5A (i.e. the one affected by the radio link failure) is configured to include any WLAN aggregation information in handover preparation messages (e.g. a handover request message and/or the like) sent to the target base station 5B. Specifically, the source base station 5A is configured to include one or more of the following: information identifying the WLAN 20 used by the mobile device 3; information identifying the mobile device's 3 current access point 21 (e.g. by its associated AP ID); information identifying a current WLAN channel utilization; information identifying a WLAN backhaul data rate; information identifying a current WLAN signal strength; information identifying an access point availability (per access point); information identifying a BSS average access delay; information identifying a BSS AC access delay; information identifying the mobile device's 3 current WLAN configuration (e.g. a required/provided QoS); and GTP tunnel termination information for identifying a tunnel used between the base station 5A and the WLAN termination node 22 for the mobile device's 3 LWA service.

If traffic (e.g. uplink traffic) is not allowed to continue via the WLAN 20 during an LTE radio link failure, then the mobile device's 3 WLAN connection is also released when the mobile device 3 is out of coverage of LTE network (base stations 5A, 5B). However, the new serving base station 5 may configure a new LWA service at any time for the mobile device 3, for example, subsequent to (or as part of) a successful RRC connection establishment.

Option 2

In case of an RRC connection re-establishment, there may be a need to maintain the mobile device's 3 existing WLAN connectivity (i.e. in order to avoid the new serving base station having to add it again).

This may be beneficial because, unlike CA, LTE-WLAN aggregation can be used for coverage enhancement (i.e. to use the coverage of the WLAN 20 in areas where LTE coverage is weak or not available). Also, radio conditions in the WLAN 20 may not necessarily be related to the radio conditions in the LTE network. Accordingly, in some cases, it may be better to keep the mobile device's 3 WLAN connection even in case of a radio link failure on its LTE connection.

In option 2, the mobile device 3 is configured to inform its target base station 5 about its ongoing WLAN aggregation (and related parameters). Specifically, the mobile device 3 includes, in a suitable message sent during the radio connection re-establishment procedure, information identifying any access point 21 visited by the mobile device 3 prior to the connection establishment with the target base station 5 (e.g. an access point 21 still being used by the mobile device 3 for LWA). This information may comprise an access point ID, or simply a flag indicating that the mobile device 3 is involved in an LWA service. In handover preparation phase, if appropriate, the serving base station 5A may convey information to the target base station 5B about any access point(s) 21 that the mobile device 3 has used previously (e.g. as part of a LTE-WLAN aggregation service). For example, the serving base station 5A may convey this information using the so-called 'UE History Information' information element (IE).

Furthermore, similarly to option 1, the serving base station 5A (i.e. the one affected by the radio link failure) is configured to include any WLAN aggregation information in handover preparation messages (e.g. a handover request message and/or the like) sent to the target base station 5B.

If traffic (e.g. uplink) is allowed to continue via the WLAN 20 during LTE radio link failure, then the mobile device 3 can continue communicating via the WLAN 20 when it is out of coverage of LTE network (base stations 5A, 5B). In this case, it will be appreciated that the UE context for the LWA service (in the serving base station 5A and the WLAN termination node 22) is only released when the mobile device 3 moves out of WLAN coverage as well. The release of the UE context is achieved by appropriate signalling over Xw interface (between the WLAN termination node 22 and the serving base station 5A).

It will be appreciated that UE context release over the Xw interface may be initiated by either the (old) serving base station 5A or the WLAN termination node 22. For example, the WLAN termination node 22 may be configured to send a UE context release request message to the serving base station 5A when the mobile device 3 is deemed to be outside the coverage of the WLAN 20. The serving base station 5A may be configured to send a UE context release request message to the WLAN termination node 22 when it deems the mobile device 3 to be outside the coverage of its cell(s). Moreover, the serving base station 5A may also send a UE context release request message to the WLAN termination node 22 when it deems the mobile device 3 to be outside the coverage of WLAN 20 (e.g. based on signal measurement reports provided by the mobile device 3) and/or any other reason such as congestion etc. It will be appreciated that such UE context release request may be sent in both Scenario 1 and Scenario 2 of FIG. 2.

Beneficially, after a successful RRC re-establishment attempt by the mobile device, unnecessary signalling for (terminating and then) re-configuring the mobile device's WLAN connection can be avoided by the mobile device informing its target base station about its ongoing WLAN aggregation (and related parameters).

UE History Information

Section 9.2.1.42 of 3GPP TS 36.413 V 13.0.0 describes that the UE History Information IE contains information about cells that the mobile device 3 has been served by in active state prior to being handed over to the target cell (in this case, the base station 5B). The UE History Information IE is included in handover preparation messages transmitted from the source base station 5A to the target base station 5B (when preparing for a handover of a mobile device being in RRC connected state).

Beneficially, however, in this system the UE history information IE also includes information relating to the mobile device's 3 ongoing LWA service (e.g. WLAN/AP used).

Specifically, the source base station 5A is configured to include, in the UE history information IE, information identifying the WLAN 20 and/or the access point(s) 21 that the mobile device 3 has previously been connected to, and also include a time parameter (such as a time stamp and/or a duration) identifying the time when the mobile device 3 was connected to that particular WLAN/AP. Table 1 below illustrates a possible implementation of the UE history information IE.

The target base station 5B is configured to use this information in its decision whether or not to use (or continue using) LTE-WLAN aggregation (via the current access point) for this mobile device 3. For example, if the target base station 5B determines that the mobile device 3 stayed within the WLAN 20 for a shorter period than a predetermined threshold duration or it determines that the mobile device 3 connected to more access points than a predetermined threshold number, the target base station 5B may decide that a single LTE bearer may be more beneficial for this mobile device 3. In this case, the target base station 5B does not configure any LWA for the mobile device 3 (and/or configures the mobile device 3 to terminate any existing WLAN connection) when the target base station 5B admits the mobile device 3 into its cell.

The target base station 5B may also use the UE history information for radio resource management purposes. For example, the target base station 5B may be configured to estimate whether the mobile device 3 is likely to achieve a better throughput using the WLAN 20 only, the LTE access network, or using both (i.e. LWA), before deciding on whether or not to maintain the LWA service for the mobile device 3.

TABLE 1

UE history information IE

| IE/Group Name | Presence | Range | IE type and reference | Semantics description |
|---|---|---|---|---|
| Last Visited Cell List | | 1 ... <maxnoOfCells> | | Most recent information is added to the top of this list. |
| >Last Visited Cell Information | M | | 9.2.1.43 | |
| Last Visited AP List | | 1 ... <maxnoOfAP> | | Most recent information is added to the top of this list. |
| >Last Visited AP Information | M | | | For example: AP ID; time stamp/ duration; indication of ongoing LWA service; eNB (ID) managing the LWA service; etc. |

<Modifications and Alternatives>

Detailed exemplary embodiments have been described above. As those skilled in the art will appreciate, a number of modifications and alternatives can be made to the above embodiments whilst still benefiting from the inventions embodied therein. By way of illustration only a number of these alternatives and modifications will now be described.

In step S610 described above with reference to FIG. 6, the WLAN termination node communicates with the serving base station to indicate which access point is currently being used by the mobile device (e.g. by sending information identifying that particular access point). However, it will be appreciated that, e.g. instead of or in addition to the WLAN termination node, the mobile device may also communicate this information to the base station (e.g. using appropriate RRC signalling and/or the like).

It will be appreciated that, depending on the WLAN technology used, the features of the WLAN termination node can be centralised on dedicated infrastructure equipment such as presented in FIG. 1, or distributed on a number of devices, e.g. on the devices participating in the WLAN (e.g. access points). Depending on the WLAN technology, this management function can have different names: for example, it can be named access point in 802.11 technologies, Master in Bluetooth technologies, and possibly named differently in other WLAN technologies.

Although not shown in FIG. 6, it will be appreciated that the serving base station may be configured to provide assistance information to the WLAN termination node and/or the mobile device, such as information identifying a set of (UE specific) preferred (and/or not preferred, i.e. blacklisted) access points within the WLAN. In this case, when performing a WLAN handover, the WLAN termination node and/or the mobile device can beneficially ensure that only preferred access points are involved in the mobile device's LWA service.

In the above description, the WLAN termination node is configured send to the serving base station, in step S610, further WLAN information that may be useful for the serving base station responsible for the LWA service. However, it will be appreciated that the mobile device may also be configured to send, to its serving base station, such WLAN information including one or more of: information identifying a WLAN channel utilization; information identifying a WLAN backhaul data rate; information identifying a WLAN signal strength; information identifying the WLAN; information identifying an access point availability (per access point); information identifying a BSS Average Access Delay; information identifying a BSS AC Access Delay; and information identifying the mobile device's current WLAN configuration (e.g. QoS).

In the above description, the UE history information IE is used to transfer information (between the source and target base stations) about cells that the mobile device has been served by (including WLAN cells). However, it will be appreciated that instead of (or in addition to) using the UE history information IE between base stations, the mobile device may also provide information about its visited WLAN cells to its serving base station. For example, the mobile device may be configured to include any of the information shown in Table 1 in one or more appropriately formatted WLAN specific information element of a message (e.g. an RRC message) that is configured to report the mobile device's mobility state to the source base station (prior to handover) or the target base station (after handover). It will be appreciated that such WLAN specific information element(s) may comprise one or more of the following: a 'mobilityState-r12 IE', a 'mobilityHistoryAvail-r12 IE', and a 'MobilityStateParameters IE'.

Thus, effectively, the above information elements may be adapted to carry a set of parameters for the WLAN as well (rather than only for LTE), when the mobile device reports its mobility state to its serving base station. Advantageously, upon receiving the WLAN parameters from the mobile device, the source and target base station are able to exchange information relating to the mobile device's visited WLAN cells.

In the above exemplary embodiments, the mobile devices are cellular telephones. It will be appreciated that the above exemplary embodiments could be implemented using devices other than mobile telephones such as, for example, personal digital assistants, laptop computers, web browsers, etc.

In the above exemplary embodiments, the term access point has been used for illustrative purposes only and in no way shall be considered limiting the invention to any particular standard. Exemplary embodiments of the invention are applicable to systems using any type of node for accessing a local area network irrespective of the access technology used thereon. In the above exemplary embodiments, WLAN has been used as an example non-3GPP radio access technology. However, any access technologies covered in the 3GPP TS 23.402 standard (V 13.2.0), thus any other radio access technology (i.e. WiFi, WiMAX) or any wired or wireless communication technology (i.e. LAN, Bluetooth) can be used in accordance with the above embodiments. The above described exemplary embodiments may also be particularly beneficial for managing dual connectivity involving two LTE base stations (rather than an LWA service involving an LTE base station and a non-LTE access node). In this case, the access nodes (and/or the nodes denoted 'WT/LT' in FIG. 2) may be replaced by base stations. The above exemplary embodiments are applicable to non-mobile or generally stationary user equipment as well.

In the above exemplary embodiments, a number of software modules were described. As those skilled in the art will appreciate, the software modules may be provided in compiled or un-compiled form and may be supplied to the base station, the WLAN termination node, or to the mobile device as a signal over a computer network, or on a recording medium. Further, the functionality performed by part or all of this software may be performed using one or more dedicated hardware circuits. However, the use of software modules is preferred as it facilitates the updating of the base station, the WLAN termination node, and the mobile device in order to update their functionalities.

The communication apparatus may receive said information configured to identify said second communication access point from said at least one communication device or from further communication apparatus that serves both said first and said second communication access points. The further communication apparatus might comprise a wireless local area network termination node.

The first and second communication access points might use a different radio access technology to the radio access technology used by the communication apparatus. For example, the first and second communication access points might comprise access points of a wireless local area network (WLAN). The transceiver might be operable to receive one or more information element (IE) relating to mobility of said communication device (e.g. a UE history information IE, a mobilityState-r12 IE, a mobilityHistoryAvail-r12 IE, and a MobilityStateParameters IE), in which case said information configured to identify said second communication access point might be included in said one or more received IE. The controller might be operable to use said information configured to identify said second communication access point in at least one of: controlling a handover of said communication device from said communication cell to another communication cell (e.g. a communication cell operated by different communication apparatus); and controlling an interworking between said communication apparatus and a network operating said first and second access points (e.g. an aggregation of two different radio access technologies).

The transceiver might be operable to obtain, from said source communication apparatus and during said handover of communication for said communication device, information relating to a wireless area network, WLAN, that said communication access point belongs to. The information relating to the WLAN might comprise one or more of: information identifying a WLAN channel utilization; information identifying a WLAN backhaul data rate; information identifying a WLAN signal strength; information identifying said WLAN; information identifying availability of an access point of said WLAN (e.g. per access point); information identifying a basic service set, BSS, average access delay; information identifying a BSS access category access delay; and information identifying a WLAN configuration for the communication device (e.g. an associated quality of service). In this case, the controller might be adapted to manage said handover and said maintaining of said user plane communication via said communication access point in dependence on said obtained information relating to the WLAN.

The transceiver might be operable to obtain, from said source communication apparatus or from said communication device, information identifying respective measurement results for one or more communication access points of said WLAN. In this case, the controller might be adapted to manage said handover and said maintaining of said user plane communication via said communication access point in dependence on said obtained information identifying respective measurement results for one or more communication access points of said WLAN.

The transceiver might be operable to obtain, from communication apparatus of a wireless local area network (WLAN), said access point identification information configured to identify a communication access point via which said communication device engages in user plane communication (for example, when user plane communication between said communication device and said communication access point is initiated).

The communication apparatus might comprise a base station operating in accordance with the long term evolution (LTE) family of standards. The second RAN might comprise a wireless local area network (WLAN).

The communication device might be operable to send, to said first RAN, when re-establishing said control plane connection and/or said first user plane connection with said first RAN, information identifying said second user plane connection.

The communication device might be operable to re-establish said control plane connection and/or said first user plane connection with said first RAN via the same base station or via a different base station of said first RAN. If the communication device is operable to re-establish said control plane connection and/or said first user plane connection with said first RAN via a different base station of said first RAN, the communication device might be operable to receive a handover request from said base station of said first RAN, and re-establish said control plane connection and/or said first user plane connection via said different base station in response to receiving said handover request.

Various other modifications will be apparent to those skilled in the art and will not be described in further detail here.

The whole or part of the exemplary embodiments disclosed above can be described as, but not limited to, the following supplementary notes.

(Supplementary note 1) Communication apparatus for providing communication access to a communication network, the communication apparatus comprising: a controller adapted to operate a communication cell; and a transceiver operable: to transmit control plane data to at least one communication device in said communication cell wherein said control plane data facilitates user plane communication by the at least one communication device, via a first communication access point; and to receive, when said user plane communication has been handed over from said first communication access point to a second communication access point, information configured to identify said second communication access point.

(Supplementary note 2) The communication apparatus according to Supplementary note 1, wherein said information configured to identify said second communication access point is received from said at least one communication device.

(Supplementary note 3) The communication apparatus according to Supplementary note 1, wherein said information configured to identify said second communication access point is received from further communication apparatus that serves both said first and said second communication access points.

(Supplementary note 4) The communication apparatus according to Supplementary note 3, wherein said further communication apparatus comprises a wireless local area network termination node.

(Supplementary note 5) The communication apparatus according to any one of Supplementary notes 1 to 4, wherein said first and second communication access points use a different radio access technology to the radio access technology used by said communication apparatus.

(Supplementary note 6) The communication apparatus according to any one of Supplementary notes 1 to 5, wherein said first and second communication access points comprise access points of a wireless local area network. WLAN.

(Supplementary note 7) The communication apparatus according to any one of Supplementary notes 1 to 6, wherein said transceiver is operable to receive one or more information element. IE, relating to mobility of said communication device (e.g. a UE history information IE, a mobilityState-r12 IE, a mobilityHistoryAvail-r12 IE, and a MobilityStateParameters IE), and wherein said information configured to identify said second communication access point is included in said one or more received IE.

(Supplementary note 8) The communication apparatus according to any one of Supplementary notes 1 to 7, wherein said controller is operable to use said information configured to identify said second communication access point in at least one of: controlling a handover of said communication device from said communication cell to another communication cell (e.g. a communication cell operated by different communication apparatus); and controlling an interworking between said communication apparatus and a network operating said first and second access points (e.g. an aggregation of two different radio access technologies).

(Supplementary note 9) Communication apparatus for providing communication access to a communication network, the communication apparatus being configured to operate as a target communication apparatus comprising: a transceiver operable: to receive, from source communication apparatus, handover request signalling for requesting handover of communication for a communication device, served by said source communication apparatus, said handover request signalling comprising access point identification information configured to identify a communication access point via which said communication device engages in user plane communication; and a controller adapted to manage handover of said communication for said communication device from the source communication apparatus to said target communication apparatus whilst maintaining said user plane communication via said communication access point identified by said access point identification information.

(Supplementary note 10) The communication apparatus according to Supplementary note 9, wherein said transceiver is operable to obtain, from said source communication apparatus and during said handover of communication for said communication device, information relating to a wireless area network, WLAN, that said communication access point belongs to.

(Supplementary note 11) The communication apparatus according to Supplementary note 10, wherein said information relating to the WLAN comprises one or more of: information identifying a WLAN channel utilization; information identifying a WLAN backhaul data rate; information identifying a WLAN signal strength; information identifying said WLAN; information identifying availability of an access point of said WLAN (e.g. per access point); information identifying a basic service set. BSS, average access delay; information identifying a BSS access category access delay; and information identifying a WLAN configuration for the communication device (e.g. an associated quality of service).

(Supplementary note 12) The communication apparatus according to Supplementary note 10 or 11, wherein said controller is adapted to manage said handover and said maintaining of said user plane communication via said communication access point in dependence on said obtained information relating to the WLAN.

(Supplementary note 13) The communication apparatus according to any one of Supplementary notes 9 to 12, wherein said transceiver is operable to obtain, from said source communication apparatus or from said communication device, information identifying respective measurement results for one or more communication access points of said WLAN.

(Supplementary note 14) The communication apparatus according to Supplementary note 13, wherein said controller is adapted to manage said handover and said maintaining of said user plane communication via said communication access point in dependence on said obtained information identifying respective measurement results for one or more communication access points of said WLAN.

(Supplementary note 15) Communication apparatus for providing communication access to a communication network, the communication apparatus being configured to operate as a source communication apparatus comprising: a transceiver operable: to transmit, to target communication apparatus, handover request signalling for requesting handover of communication for a communication device, served by said source communication apparatus, said handover request signalling comprising access point identification information configured to identify a communication access point via which said communication device engages in user plane communication.

(Supplementary note 16) The communication apparatus according to Supplementary note 15, wherein said transceiver is operable to obtain, from communication apparatus of a wireless local area network. WLAN, said access point identification information configured to identify a communication access point via which said communication device engages in user plane communication.

(Supplementary note 17) The communication apparatus according to Supplementary note 16, wherein said transceiver is operable to obtain said access point identification information configured to identify a communication access point via which said communication device engages in user plane communication, when user plane communication between said communication device and said communication access point is initiated.

(Supplementary note 18) The communication apparatus according to any one of Supplementary notes 15 to 17, wherein said transceiver is operable to obtain information relating to a wireless area network, WLAN, that said communication access point belongs to.

(Supplementary note 19) The communication apparatus according to Supplementary note 19, wherein said information relating to the WLAN comprises one or more of: information identifying a WLAN channel utilization; information identifying a WLAN backhaul data rate; information identifying a WLAN signal strength; information identifying said WLAN; information identifying availability of an access point of said WLAN (e.g. per access point); information identifying a basic service set, BSS, average access delay; information identifying a BSS access category access delay; and information identifying a WLAN configuration for the communication device (e.g. an associated quality of service).

(Supplementary note 20) The communication apparatus according to any one of Supplementary notes 1 to 19, comprising a base station operating in accordance with the long term evolution, LTE, family of standards.

(Supplementary note 21) Communication apparatus for a wireless local area network, WLAN, comprising a plurality of communication access points configured to provide user plane communication to at least one communication device, the communication apparatus comprising: a controller operable: to obtain, when a user plane communication has been handed over from a first communication access point to a second communication access point, information configured to identify said second communication access point; and a transceiver operable: to transmit, to communication apparatus of another communication network providing user plane communication to said at least one communication device, information identifying said second communication access point.

(Supplementary note 22) A communication device comprising: a transceiver operable to establish: a control plane connection with a first radio access network (RAN), via a base station of said first RAN; a first user plane connection via said first base station; and a second user plane connection via an access point of a second RAN; and a processor operable to determine that said transceiver needs to re-establish said control plane connection and/or said first user plane connection with said first RAN; wherein said transceiver is operable to maintain said second user plane connection at least until completion of said radio connection re-establishment via the first RAN.

(Supplementary note 23) The communication device according to Supplementary note 22, wherein said transceiver is operable to send, to said first RAN, when re-establishing said control plane connection and/or said first user plane connection with said first RAN, information identifying said second user plane connection.

(Supplementary note 24) The communication device according to Supplementary note 22 or 23, wherein said second RAN comprises a wireless local area network (WLAN).

(Supplementary note 25) The communication device according to any one of Supplementary notes 22 to 24, wherein said transceiver is operable to re-establish said control plane connection and/or said first user plane connection with said first RAN via the same base station.

(Supplementary note 26) The communication device according to any one of Supplementary notes 22 to 25, wherein said transceiver is operable to re-establish said control plane connection and/or said first user plane connection with said first RAN via a different base station of said first RAN.

(Supplementary note 27) The communication device according to Supplementary note 26, wherein said transceiver is operable to receive a handover request from said base station of said first RAN, and re-establish said control plane connection and/or said first user plane connection via said different base station in response to receiving said handover request.

(Supplementary note 28) A communication device comprising: a transceiver operable to establish: a control plane connection with a radio access network (RAN), via a base station of said first RAN; a first user plane connection via said base station; and a second user plane connection via a first communication access point of a second RAN; wherein said transceiver is operable to send, to said base station and responsive to said user plane communication being handed over from said first communication access point to a second communication access point of said second RAN, information configured to identify said second communication access point.

(Supplementary note 29) A system comprising the communication apparatus according to any one of Supplementary notes 1 to 8 and Supplementary notes 15 to 20; the communication apparatus according to any one of Supplementary notes 9 to 14, the communication apparatus according to Supplementary note 21; and the communication device according to any one of Supplementary notes 22 to 28.

(Supplementary note 30) A method performed by communication apparatus for providing communication access to a communication network via a communication cell, the method comprising: transmitting control plane data to at least one communication device in said communication cell, wherein said control plane data facilitates user plane communication by the at least one communication device, via a first communication access point; and receiving, when said user plane communication has been handed over from said first communication access point to a second communication access point, information configured to identify said second communication access point.

(Supplementary note 31) A method performed by communication apparatus for providing communication access to a communication network, the communication apparatus being configured to operate as a target communication apparatus, the method comprising: receiving, from source communication apparatus, handover request signalling for requesting handover of communication for a communication device, served by said source communication apparatus, said handover request signalling comprising access point identification information configured to identify a communication access point via which said communication device engages in user plane communication; and managing handover of said communication for said communication device from the source communication apparatus to said target communication apparatus whilst maintaining said user plane communication via said communication access point identified by said access point identification information.

(Supplementary note 32) A method performed by communication apparatus for providing communication access to a communication network, the communication apparatus being configured to operate as a source communication apparatus, the method comprising: transmitting, to target communication apparatus, handover request signalling for requesting handover of communication for a communication device, served by said source communication apparatus, said handover request signalling comprising access point identification information configured to identify a communication access point via which said communication device engages in user plane communication.

(Supplementary note 33) A method performed by communication apparatus for a wireless local area network, WLAN, comprising a plurality of communication access points configured to provide user plane communication to at least one communication device, the method comprising: obtaining, when said user plane communication has been handed over from a first communication access point to a second communication access point, information configured to identify said second communication access point; and transmitting, to communication apparatus of another communication network providing user plane communication to said at least one communication device, information identifying said second communication access point.

(Supplementary note 34) A method performed by a communication device, the method comprising: establishing: a control plane connection with a first radio access network (RAN), via a base station of said first RAN; a first user plane connection via said first base station; and a second user plane connection via an access point of a second RAN; determining that said control plane connection and/or said first user plane connection needs to be re-established with said first RAN; and maintaining said second user plane connection at least until completion of said radio connection re-establishment via the first RAN.

(Supplementary note 35) A computer implementable instructions product comprising computer implementable instructions for causing a programmable communications device to perform the method according to any one of Supplementary notes 30 to 34.

The invention claimed is:

1. A method performed by communication apparatus, the method comprising:
    transmitting control plane data to at least one communication device, wherein the control plane data facilitates user plane communication by the at least one communication device;
    receiving, when the user plane communication has been handed over from a first communication access point to a second communication access point, information configured to identify the second communication access point; and
    receiving information on mobility of the at least one communication device in a network including the first communication access point and the second communication access point,
    wherein the information includes information identifying at least one communication access point to which the at least one communication device was previously connected, and a time parameter identifying time when the at least one communication device was connected to that at least one communication access point, and
    wherein the method further comprises determining whether or not the at least one communication device is allowed to connect to the second communication access point based on a number of the at least on communication access point to which the at least one communication device was previously connected.

2. The method according to claim 1, wherein the information configured to identify the second communication access point is received from the at least one communication device.

3. The method according to claim 1, wherein the information configured to identify the second communication access point is received from another communication apparatus that serves both the first communication access point and the second communication access point.

4. The method according to claim 3, wherein the another communication apparatus comprises a wireless local area network termination node.

5. The method according to claim 1, wherein the first communication access point and the second communication access point use a different radio access technology to the radio access technology used by the communication apparatus.

6. The method according to claim 1, wherein the first communication access point and the second communication access point comprise access points of a wireless local area network (WLAN).

7. The method according to claim 1, wherein the control plane data is transmitted via the first communication access point.

8. The method according to claim 1, wherein the method further comprises:
using the information configured to identify the second communication access point in at least one of: controlling a handover of said communication device from a communication cell to another communication cell; and
controlling an interworking between said communication apparatus and the network operating said first and second communication access points.

9. Communication apparatus for providing communication access to a communication network, the communication apparatus comprising:
a controller;
a transmitter configured to transmit control plane data to at least one communication device, wherein the control plane data facilitates user plane communication by the at least one communication device; and
a receiver configured to receive, when the user plane communication has been handed over from a first communication access point to a second communication access point, information configured to identify the second communication access point,
wherein the receiver is further configured to receive information on mobility of the at least one communication device in a network including the first communication access point and the second communication access point, and
wherein the information includes information identifying at least one communication access point to which the at least one communication device was previously connected, and a time parameter identifying time when the at least one communication device was connected to that at least one communication access point, and
wherein the controller determines whether or not the at least one communication device is allowed to connect to the second communication access point based on a number of the at least one communication access point to which the at least on communication device was previously connected.

* * * * *

UNITED STATES PATENT AND TRADEMARK OFFICE
CERTIFICATE OF CORRECTION

PATENT NO. : 10,674,415 B2
APPLICATION NO. : 15/748432
DATED : June 2, 2020
INVENTOR(S) : Vivek Sharma Page 1 of 1

It is certified that error appears in the above-identified patent and that said Letters Patent is hereby corrected as shown below:

In the Specification

Column 1, Technical Field, Line 25; Delete "LTE-Advanced." and insert --LTE-Advanced,-- therefor Column 4, Brief Description of Drawings, Line 67; Delete "service:" and insert --service;-- therefor Column 18, Description of Embodiments, Lines 55-56; Delete "technologies." and insert --technologies,-- therefor Column 21, Description of Embodiments, Line 49; After "cell", insert --,--

Column 22, Description of Embodiments, Line 13; Delete "network." and insert --network,-- therefor Column 22, Description of Embodiments, Line 17; Delete "element." and insert --element,-- therefor Column 22, Description of Embodiments, Line 67; Delete "set." and insert --set,-- therefor Column 23, Description of Embodiments, Line 41; Delete "network." and insert --network,-- therefor Column 25, Description of Embodiments, Line 11; Delete "14," and insert --14;-- therefor In the Claims Column 26, Line 44; In Claim 1, delete "at least on" and insert --at least one-- therefor Column 28, Line 20; In Claim 9, delete "at least on" and insert --at least one-- therefor Signed and Sealed this
Twenty-fourth Day of November, 2020

Andrei Iancu
*Director of the United States Patent and Trademark Office*